United States Patent [19]

Nakayama

[11] Patent Number: 5,023,858
[45] Date of Patent: Jun. 11, 1991

[54] SEPARATION TYPE OPTICAL PICKUP DEVICE

[75] Inventor: Masahiko Nakayama, Yokohama, Japan

[73] Assignee: Ricoh Company, Ltd., Tokyo, Japan

[21] Appl. No.: 485,245

[22] Filed: Feb. 26, 1990

[30] Foreign Application Priority Data

Feb. 28, 1989 [JP] Japan .................................... 1-48268
Jun. 26, 1989 [JP] Japan .................................... 1-163275
Dec. 15, 1989 [JP] Japan .................................... 1-325189

[51] Int. Cl.$^5$ ............................................. G11B 7/00
[52] U.S. Cl. ...................................... 369/112; 369/111
[58] Field of Search ...................... 369/36, 38, 39, 244, 369/114, 115, 110, 112

[56] References Cited

U.S. PATENT DOCUMENTS 4,322,838  3/1982  Neumann ............................. 369/112

Primary Examiner—Roy N. Envall, Jr.
Assistant Examiner—Hindi Nabil
Attorney, Agent, or Firm—Cooper & Dunham

[57] ABSTRACT

A separation type optical pickup device for an optical information reading/writing apparatus using an optical recording medium. The device comprises a fixed optical system and a movable optical system. The fixed optical system is unmovable with respect to the recording medium and includes a laser beam source and has an opening through which the laser beam is output. The movable optical system is movable with respect to the recording medium and has an opening through which the laser beam is transmitted from the fixed optical system and includes a light guide for guiding the laser beam to the recording medium in a form of a convergent beam focussed on a surface of the recording medium. An expansible hollow member interconnects the fixed optical system and movable optical system in a state wherein the openings of the two systems as well as an optical path of the laser beam between the openings are enclosed by the hollow member.

12 Claims, 6 Drawing Sheets

SEPARATION TYPE OPTICAL PICKUP DEVICE

BACKGROUND OF THE INVENTION

1. Field of the Invention

The present invention relates to an optical pickup device. More particularly, the invention relates to a separation type optical pickup device which comprises an optical system for reading and writing information by scanning a recording medium with the use of a laser beam and/or for erasing the information wherein a part of the optical system is divided so that the divisional part is movable at the time of the scanning or erasing operation.

2. Description of the Related Art

In an optical information recording device, data pits are formed on a recording disk to write information thereon and the recorded information is read by scanning the row of data pits. Such a recording device comprises an optical pickup device which converges a scanning laser beam on the recording surface of the disk and also guides the reflection rays reflected from the disk surface to a photoelectric transducer to read information from the pits formed on the disk surface.

In accordance with an example of such an optical pickup device, a part of the optical system is divided so that the divisional part can be separated from the laser source portion and freely moved independently. This separation type pickup device primarily comprises an optical pickup device body housing a semiconductor laser source therein and a movable light guide system which reflects and transmits the laser beam from the laser source to the optical information recording medium in the form of a disk as well as converges the beam on the disk surface.

The device body is fixed to the body frame of an optical information read/write apparatus and comprises the semiconductor laser beam, a polarization beam splitter, a quarter-wave plate and an optical detector element.

On the other hand, the light guide system is movable on the body frame in the radial direction of the disk in the state of being faced to the recording surface of the disk. The guide system comprises an objective lens for converging the beam on the disk surface and a deflection prism for changing the direction of the optical path of the laser beam output from the laser source in the device body side toward the objective condenser lens.

In accordance with the separation type optical pickup device having the above-mentioned structure, it becomes possible to reduce the weight of the movable light guide system for scanning the recording disk surface by providing only a focus servo means thereon, which makes it possible to achieve a high speed scanning operation.

However, dusts enter into the device through an opening for passing through the laser beam formed between the fixed system of the device body side and the movable system of the light guide side, which impairs the reliability of the optical function of the device.

The optical guide system moves for scanning operation so that the opening is narrow when the guide system is located in the vicinity of the fixed body while the opening becomes wide when the guide system is shifted remote from the body so that dusts are easy to enter into the device which dusts attach on the optical elements in the device and impair the function of setting the optical path or luminous intensity of the system.

In order to cope with the above-mentioned dust problem, it may be considered to enclose each of the device body and the movable guide with a cover except for the portion of the optical path. However, if the light guide system is sealingly enclosed with a cover, the pressure in the guide system may be changed along with the motion thereof, which causes misfocussing of the condenser lens.

SUMMARY OF THE INVENTION

It is therefore an object of the present invention to provide a separation type optical pickup device in which the above-mentioned dust problem can be obviated so that the dusts or other undesirable particles which impair the optical function of the device are prevented from entering into the device.

Another object of the present invention is to provide a separation type optical pickup device which reliably achieves the focus control of the optical system of the device which is provided with the arrangement for avoiding the entrance of the dusts.

The object of the invention can be achieved by a separation type optical pickup device installed in an optical information read/write apparatus comprising: a fixed optical system which is fixed to an apparatus body and includes a semiconductor laser source which emits a laser beam for scanning an information recording medium; a movable optical system which is movable with respect to the apparatus body and includes an objective lens for converging the laser beam on the recording medium to form a minute spot thereon; and a hollow member which interconnects the fixed system and the movable system and is linked with the movable system in such a way that the member moves along with the movable system in a state of enclosing an optical path arranged between the fixed system and the movable system.

Also, the object of the invention can be achieved by a separation type optical pickup device installed in an optical information resd/write apparatus comprising: a fixed optical system which is fixed to an apparatus body and includes a semiconductor laser source which emits a laser beam for scanning an information recording medium; a movable optical system which is movable with respect to the apparatus body and includes an objective lens for converging the laser beam on the recording medium to form a minute spot thereon and has a first opening through which the laser beam is transmitted from the fixed system and a second opening formed at a position facing to the apparatus body; a first hollow member which interconnects the first opening and the fixes system; and a second hollow member which interconnects the second opening and the apparatus body.

Further, the object of the invention can be achieved by a separation type optical pickup device comprising: a fixed optical system which comprises a semiconductor laser source for emitting a laser beam and a collimator lens for collimating the laser beam and has an opening through which the laser beam is output; a movable optical system which comprises a deflection prism for deflecting the collimated laser beam transmitted from the fixed system and an objective lens for converging the deflected laser beam on an optical information recording medium and has an opening through which the laser beam is transmitted from the fixed system; an expansible hollow member which interconnects the opening of the fixed system and the opening of the movable system and encloses an optical path between the openings; and a transparent shutter member which is arranged in the movable system to interpose between the hollow member and the objective lens.

In accordance with the structure of the present invention, the optical path arranged between the fixed system having the semiconductor laser source mounted therein and the movable system to guide the laser beam to the recording medium is isolated from outside.

Also, in accordance with the present invention, when the volume of one of the hollow members changes, the other compensates for the volume change so that the total volume of the two hollow members is unchanged, whereby the pressure in the system can be maintained constant.

Also, in accordance with the present invention, the lens portion is separated from the other part of the system so that the lens position which is adjusted by controlling the focal point thereof is not changed by the change of pressure in the optical path in the portion other than the lens position.

An advantage of the present invention is that it becomes possible to avoid the entrance of the dusts or other undesirable particles into the system and achieve a reliable optical function of the system due to the arrangement of the hollow member which interconnects the fixed optical system and the movable optical system in such a way that the optical path formed between the two optical systems is enclosed so that the optical elements in the systems are isolated from the outside.

Also, another advantage in accordance with the present invention is that due to the arrangement wherein two hollow members are arranged in both sides of the movable optical system in such a way that when the volume of one of the hollow members is changed, the other member compensates for the volume change so that the total volume of the two hollow members is unchanged, it becomes possible to maintain the pressure in the movable system constant whereby misfocussing of the lens in the system can be avoided so that the optical function of the system can be conducted reliably.

Still another advantage of the invention is that the focus control can be accurately performed since the pressure change in the system does not influence the objective lens due to the arrangement wherein the portion of the objective lens is separated from the other portion in the system enclosed in the sealing structure.

Further objects and advantages of the present invention will be apparent from the following description of the preferred embodiments of the invention as illustrated in the accompanying drawings.

DESCRIPTION OF THE PREFERRED EMBODIMENTS

Figure 1:
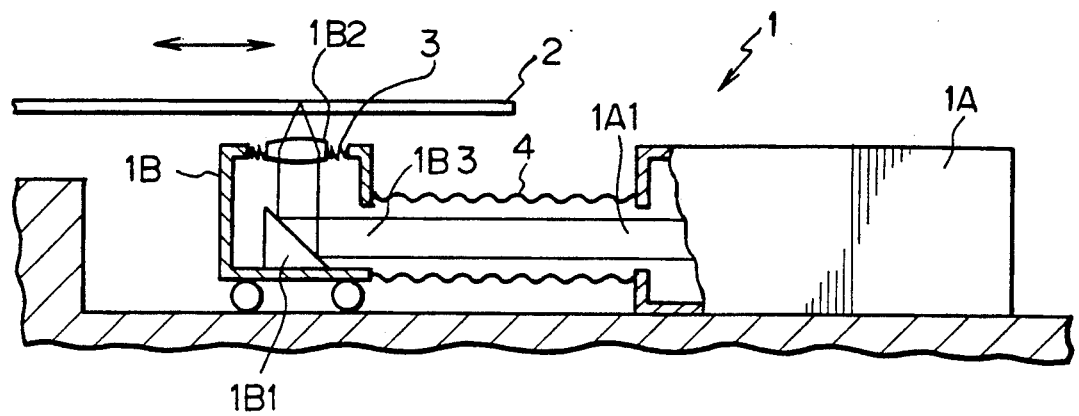
FIG. 1 is a constructional view of a whole structure of a separation type optical pickup device in accordance with an embodiment of the present invention.

Embodiments of the present invention are described hereinafter with reference to the drawings in comparison to the structures of the related art which are in the state of being unimproved and also represented in the drawings.

Figure 10:
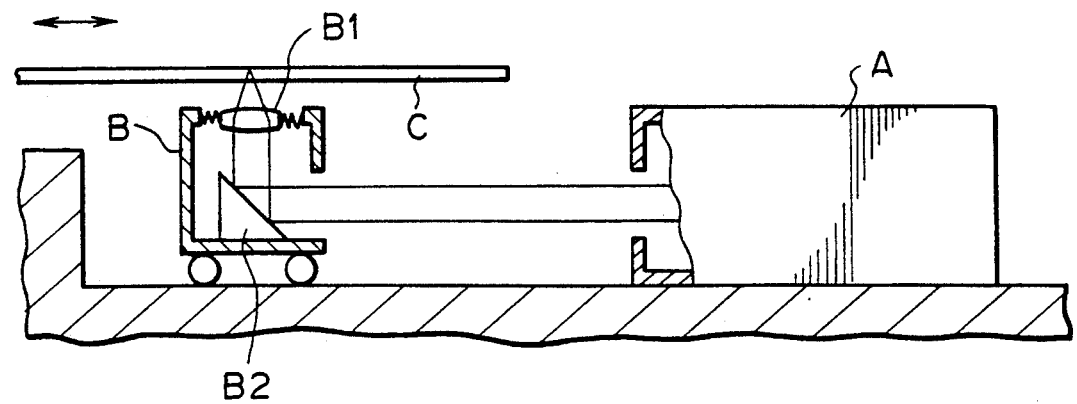
FIG. 10 is a constructional view of a whole structure of a separation type optical pickup device in accordance with a related art.

In accordance with an example of an optical pickup device related to the present invention, as illustrated in FIG. 10, a part of the optical system is divided so that the divisional part can be separated from the laser source portion and freely moved independently. This separation type optical pickup device primarily comprises an optical pickup device body A housing a semiconductor laser source therein and a movable light guide system B which reflects and transmits the laser beam from the laser source to the optical information recording medium in the form of a disk C as well as converges the beam on the disk surface.

The device body A is fixed to the body frame of an optical information read/write apparatus and comprises the semiconductor laser beam, a polarization beam splitter, a quarter-wave plate and an optical detector element.

On the other hand, the light guide system B is movable on the body frame in the radial direction (indicated by an arrow in the drawing) of the disk C in the state of being faced to the recording surface of the disk C. The guide system comprises an objective lens B1 for converging the beam on the disk surface and a deflection prism B2 for changing the direction of the optical path of the laser beam output from the laser source in the device body side toward the objective condenser lens B2.

In accordance with the separation type optical pickup device having the above-mentioned structure, it becomes possible to reduce the weight of the movable light guide system B for scanning the recording disk surface by providing only a focus servo means thereon, which makes it possible to achieve a high speed scanning operation.

However, dusts enter into the device through an opening for passing through the laser beam formed between the fixed system of the device body side and the movable system of the light guide side, which impairs the reliability of the optical function of the device.

The optical guide system moves for performing the scanning operation so that the opening is narrow when the movable guide system B is located in the vicinity of the fixed body A while the opening becomes wide when the guide system B is shifted to a position remote from the body A so that dusts are easy to enter into the device which dusts attach on the optical elements in the device and impair the function of setting the optical path or luminous intensity of the system.

In order to cope with the above-mentioned dust problem, it may be considered to enclose each of the device body A and the movable guide B with a cover except for the portion of the optical path. However, if the light guide system B is sealingly enclosed with a cover, the pressure in the guide system B may be changed along with the motion thereof, which causes misfocussing of the condenser lens B1.

FIG. 1 illustrates a whole structure of an embodiment of the present invention in which the above-mentioned problems are obviated.

This embodiment is featured by an arrangement wherein the optical path between the fixed system and the movable system is covered along with the openings for the path formed in the systems.

More precisely, a separation type optical pickup device 1 primarily comprises a fixed portion 1A and a movable portion 1B.

The fixed portion 1A comprises a semiconductor laser source, a diffraction grating element, a polarization beam splitter, a quarterwave plate and an optical detector. The fixed portion 1A is formed as a unit secured to a body frame of an optical information read/write apparatus. The fixed unit 1A has an opening 1A1 for outputting a laser beam from the unit 1A.

On the other hand, the movable portion 1B comprises a deflection prism 1B1 and an objective lens 1B2 for converging the beam, along the optical path of the laser beam from the fixed portion 1A in this order. The portion 1B is also constituted as a unit. The unit of the portion 1B is movable in the radial direction (indicated by an arrow in FIG. 1) of the disk 2. The unit 1B has an opening 1B3 formed in a side wall thereof at a position facing to the opening 1A1 of the portion 1A, for receiving the laser beam from the portion 1A. Also, the objective lens 1B2 in the portion 1B is supported by a flexible member 3 which allows the lens 1B2 to move in the direction of the optical path of the beam, which enables to control the focal point of the lens 1B2.

The optical path of the beam propagating from the portion 1A to the portion 1B is enclosed by a hollow member 4 which covers the beam.

More precisely, the member 4 is made from a bellows which interconnects the opening 1A1 of the portion 1A and the opening 1B3 of the portion 1B. The bellows is expansible along the beam and encloses the beam so that it is expanded or contracted according as the portion 1B moves. In such a way, the beam passage between the portions 1A and 1B is covered and isolated from the outside as well as the openings 1A1 and 1B3 of the portions 1A and 1B.

Figure 2A:
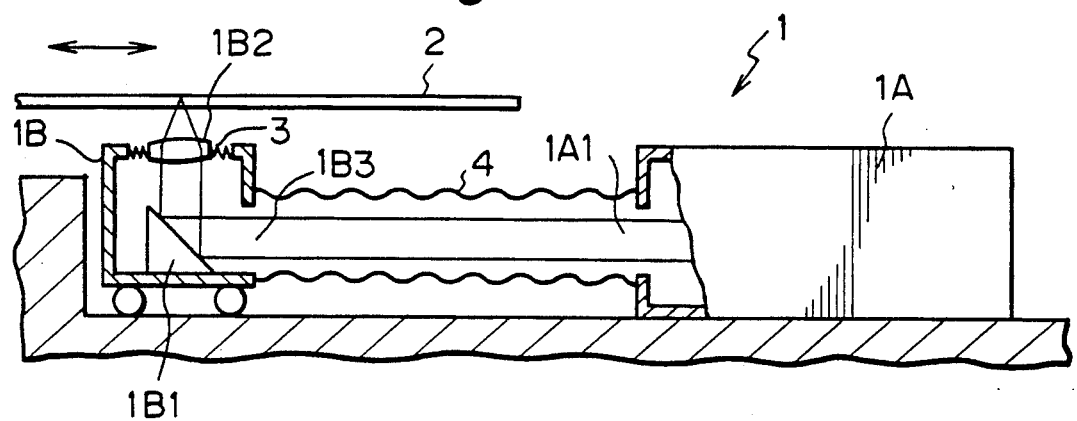
FIG. 2a is an explanatory view of the device of FIG. 1 for explaining a function thereof and illustrating a state of being expanded.

FIG. 2a illustrates the device 1 in the state wherein the member 4 is expanded when the portion 1B is moved away from the portion 1A at the time of the scanning operation of the disk 2.

Figure 2B:
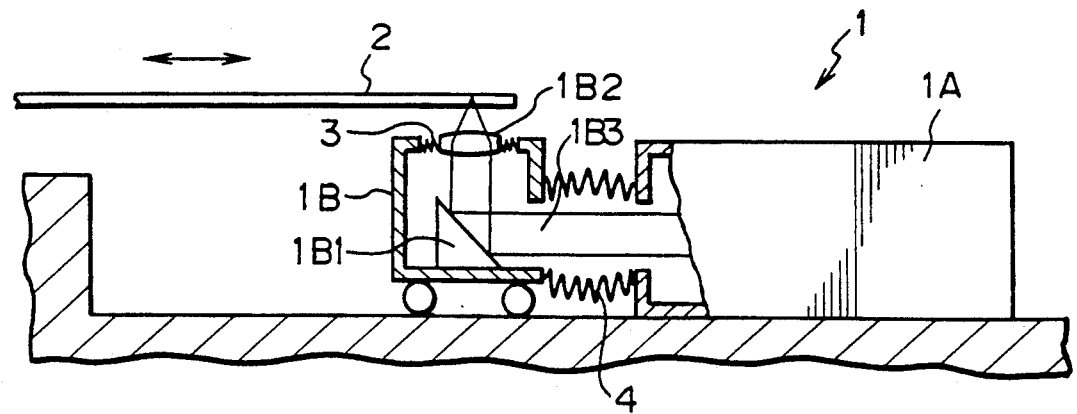
FIG. 2b is an explanatory view of the device of FIG. 1 for explaining the function thereof and illustrating a state of being contracted.

FIG. 2b illustrates the device 1 in the state wherein the member 4 is cantracted when the portion 1B comes close to the portion 1A at the time of the scanning operation of the disk 2.

As can be seen from the drawings, the member 4 is expanded or contracted according to the movement of the portion 1B so that the beam passage is always enclosed by the member 4 as well as the openings 1A1 and 1B3 irrespective of the location of the portion 1B, whereby dusts or other undesirable particles are prevented from entering into the portions 1A and 1B through the openings 1A1 and 1B3.

Another embodiment of the present invention is described hereinafter with reference to FIGS. 3 to 6.

The same or corresponding parts of this embodiment as those of the embodiment of FIG. 1 are designated by the same numerals or characters.

Figure 3:
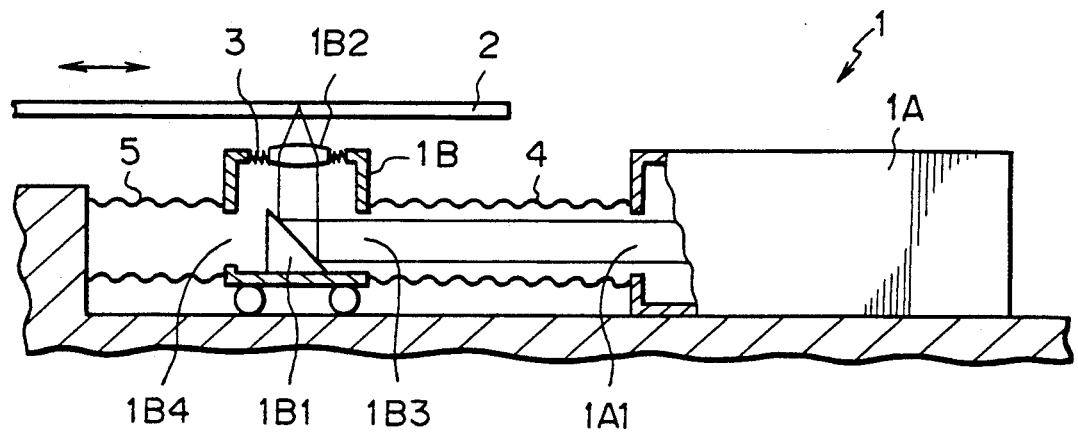
FIG. 3 is a constructional view of a whole structure of a separation type optical pickup device in accordance with another embodiment of the present invention.

The embodiment of FIG. 3 is featured by an arrangement which enables to minimize the change of the pressure in the portion 1B.

More precisely, the portion 1B of the device 1 of FIG. 3 has a second opening 1B4 formed in the opposed side of the first opening 1B3 which is formed at the position facing to the opening 1A1 of the portion 1A, as the structure of FIG. 1.

The first and second openings 1B3 and 1B4 are arranged in the sides of the portion 1B opposite to each other and in fluid flow communication with each other with respect to the direction of the movement of the portion 1B and communicate with each other through the inside of the portion 1B.

A second expansible hollow member 5 is disposed between the movable portion 1B and the apparatus body. The member 5 is made from a bellows an end of which is connected to the portion around the opening 1B4 of the unit 1B and the other end of which bellows is connected to a wall of the apparatus body so that the opening 1B4 and the apparatus body are interconnected through the member 5.

Therefore, the inner space within the first hollow member 4 is communicated with that of the second hollow member 5 through that of the portion 1B so that the total volume of the members 4 and 5 in addition to the portion 1B is constant.

Figure 4A:
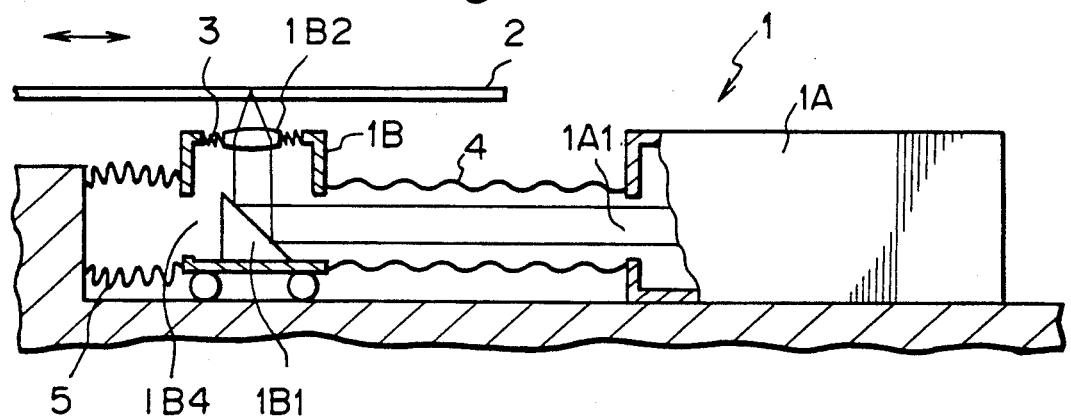
FIG. 4a is an explanatory view of the device of FIG. 3 for explaining a function thereof and illustrating a state of being expanded.

FIG. 4a illustrates the device of FIG. 3 in a state wherein the member 4 is expanded while the member 5 is contracted when the portion 1B is moved away from the portion 1A at the time of scanning the disk 2.

Figure 4B:
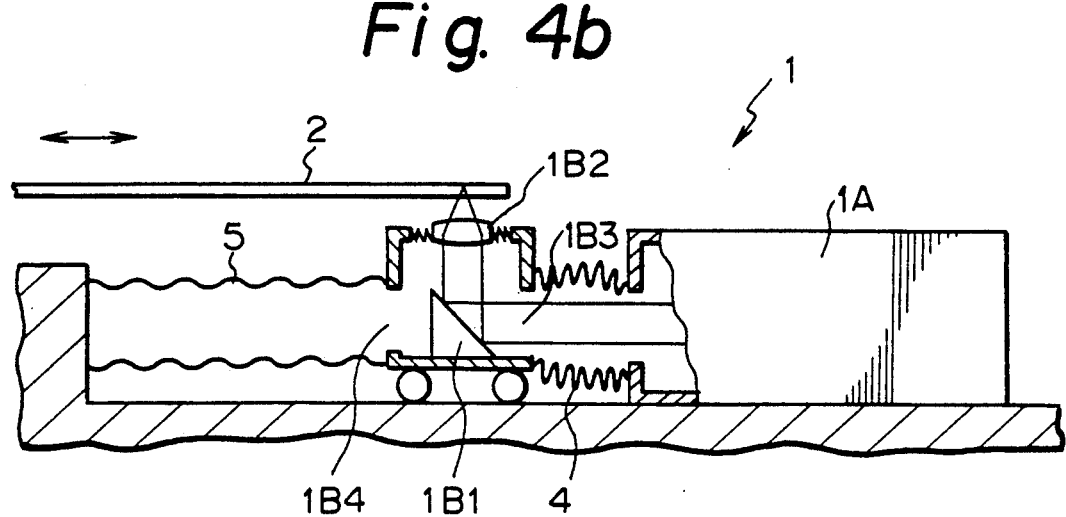
FIG. 4b is an explanatory view of the device of FIG. 3 for explaining the function thereof and illustrating a state of being contracted.

Whereas, FIG. 4b illustrates the device of FIG. 3 in a state wherein the member 4 is contracted while the member 5 is expanded when the portion 1B comes close to the portion 1A at the time of scanning the disk 2.

As can be seen from FIGS. 4a and 4b, when the volume of one of the two members 4 and 5 is increased by the expansion thereof, the volume of the other member is decreases by the contraction thereof, so that the inner pressure of the space within the portion 1B and the members 4 and 5 does not change. Therefore, the objective lens 1B2 is not displaced due to the pressure change in the space within the portion 1B so that a stable focus controlling operation can be achieved.

Figure 5:
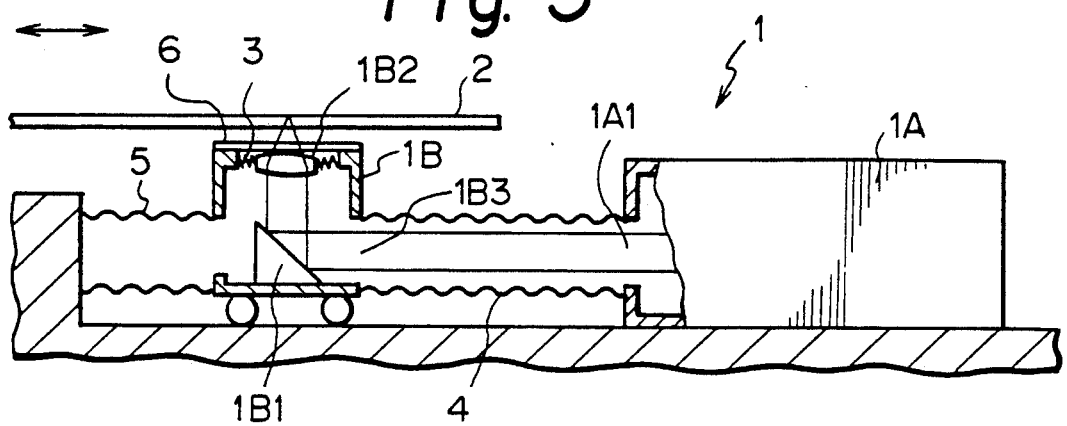
FIG. 5 is a constructional view of a whole structure of a separation type optical pickup device in accordance with still another embodiment of the present invention.

FIG. 5 illustrates another embodiment of the present invention. In this embodiment, a transparent cover 6 is disposed over the objective lens 1B2 in the portion 1B in the output side thereof so as to further reliably prevent dusts and undesirably particles from entering into the portion 1B as well as to ensure the seal of the portion 1B.

Figure 6:
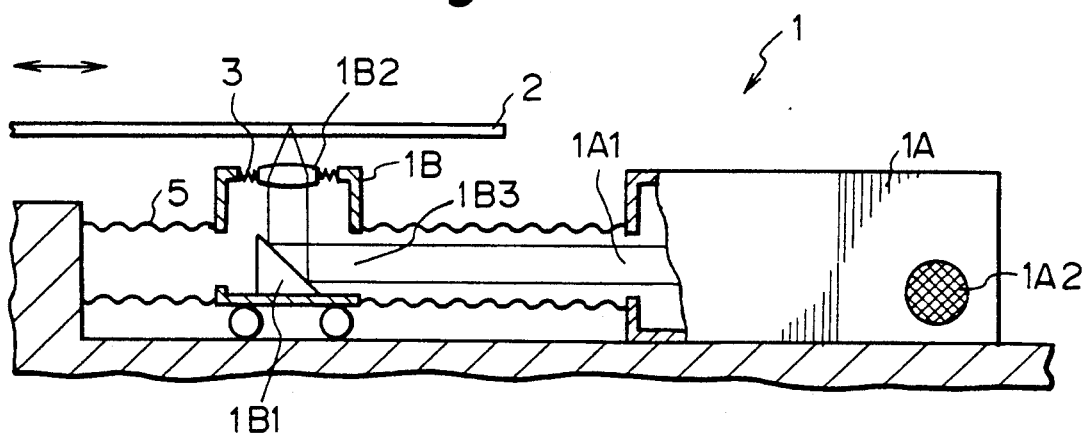
FIG. 6 is a constructional view of a whole structure of a separation type optical pickup device in accordance with further embodiment of the present invention.

FIG. 6 illustrates still another embodiment of the present invention. In this embodiment, a vent hole 1A2 is formed in a wall of the portion 1A so as to minimize the pressure change in the portion 1B when the hollow members 4 and 5 are expanded or contracted in accordance with the movement of the portion 1B at the time of scanning operation thereof. By this arrangement of the vent hole 1A2, it becomes possible to further reliably avoid the displacement of the lens 1B2 due to the pressure change within the portion 1B and the members 4 and 5.

An example of the separation type optical peckup device in accordance with the related art is further described with reference to FIG. 11.

Numeral 101 designates a fixed optical system in which a not shown semiconductor laser source and a collimator lens for collimating the laser beam emitted from the laser source are disposed. Numeral 102 designates a movable optical system in which there are arranged a deflection prism 103, an objective lens 104 and a not shown lens actuator for displacing the lens 104 in the direction perpendicular to the surface of the optical disk 105 so as to control the focal point of the lens 104. Also, in the fixed system 101, there are further arranged a tracking mirror (not shown) for conducting the track control operation and an actuator system for driving the mirror.

The structure mentioned above functions as follows. The laser beam emitted from the laser source in the system 101 is collimated by the collivator lens and output from the system 101 through an opening 106 formed in the side wall of the system 101. The beam output from the system 101 enters into the system 102 through an opening 107 formed in the side wall of the system 102 at a position facing to the opening 106 of the system 101. The beam is deflected by the prism 103 toward the lens 104 which converges the beam on the recording surface of the disk 105, whereby the disk is scanned so that information is read therefrom or written therein.

Figure 11:
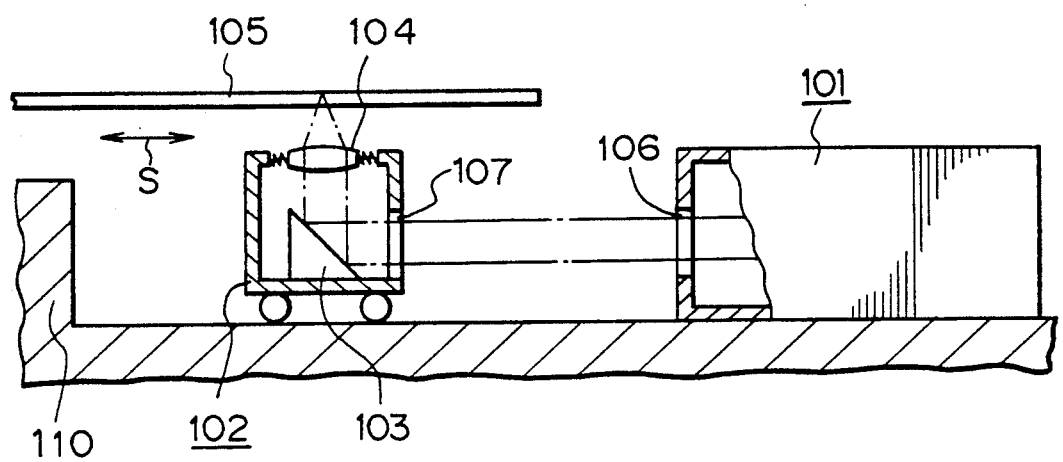
FIG. 11 is a constructional view of a whole structure of another separation type optical pickup device in accordance with a related art.

In the device of FIG. 11, the whole optical system is divided to two parts, i.e., the fixed system 101 in which the tracking servo system is installed and the movable system 102 in which the focus control system is installed. Therefore, the weight of the movable system 102 can be reduced, which makes it possible to move the system 102 at a high speed in the seeking direction S (radial direction of the disk 105).

However, in the above-mentioned separation structure of FIG. 11, since the openings 106 and 107 for transmitting the laser beam therethrough are formed in the respective systems 101 and 102, dusts enter into the systems 101 and 102 through the openings 106 and 107 and attach to the optical elements disposed therein. Such dusts impair the transparency and reflectivity of the optical elements arranged in the systems 101 and 102, which reduces the optical power of the systems required for performing the normal operation thereof, resulting that the reliability of reading and writing functions are degraded.

Besides, it is not easy to clean the dusts attached to the optical elements since the elements are usually disposed in the narrow space of the systems.

Figure 12A:
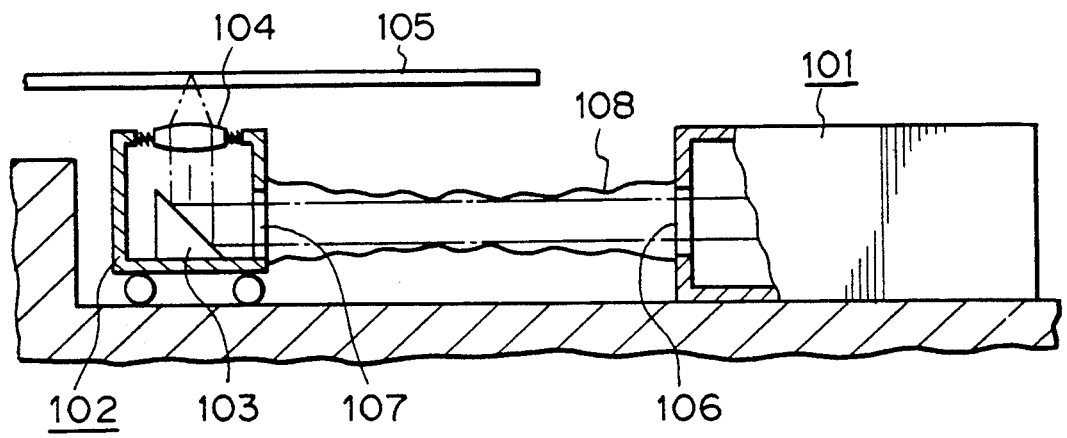
FIG. 12a is an explanatory view of another example of the separaion type optical pickup device of the related art for explaining a function thereof and illustrating a state of being expanded.
Figure 12B:
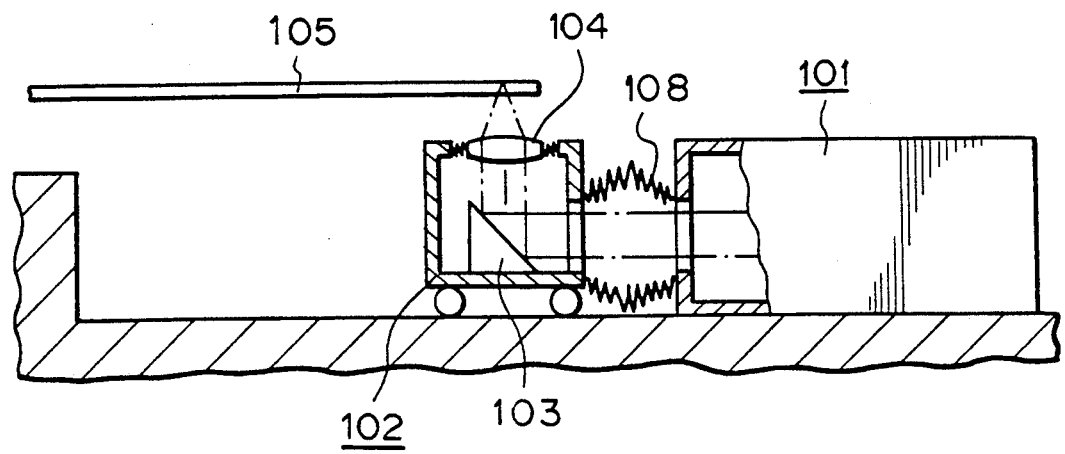
FIG. 12b is an explanatory view of the device of FIG. 12a for explaining the function thereof and illustrating a state of being contracted.

To cope with the above-mentioned dust problem, an expansible member such as a bellows 108 may be arranged between the openings 106 and 107 of the separated systems 101 and 102, respectively, as illustrated in FIGS. 12a and 12b. The bellows 108 is expanded as illustrated in FIG. 12a and contracted as illustrated in FIG. 12b, in accordance with the movement of the system 102 which moves in the seeking direction (radial direction of the disk 105) at the time of tracking operation thereof.

In accordance with such an arrangement of bellows, it becomes possible to prevent dusts from entering into the systems through the openings 106 and 107 of the systems 101 and 102.

However, in the device of FIGS. 12a and 12b, since the inner space of the systems 101 and 102 is sealingly enclosed due to the arrangement of the bellows 108 and isolated from the outside, the volume of the inner space changes when the system 102 moves in the tracking operation so that the pressure in the space changes, which forces to displace the lens 104, as indicated by an arrow in each of FIGS. 12a and 12b, which misfocusses the beam on the disk 105.

Figure 13A:
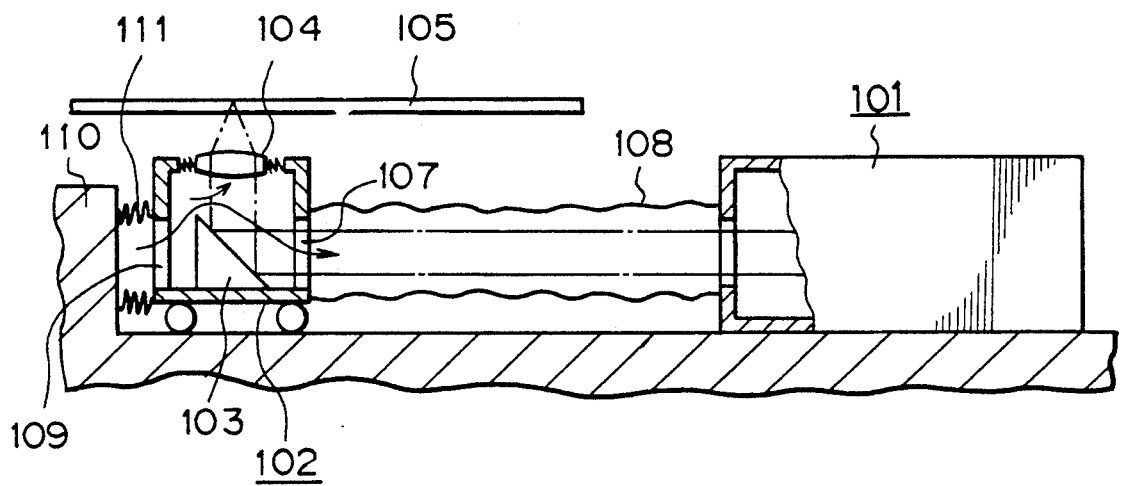
FIG. 13a is an explanatory view of still another example of the related art for explaining a function thereof and illustrating a state of being expanded.
Figure 13B:
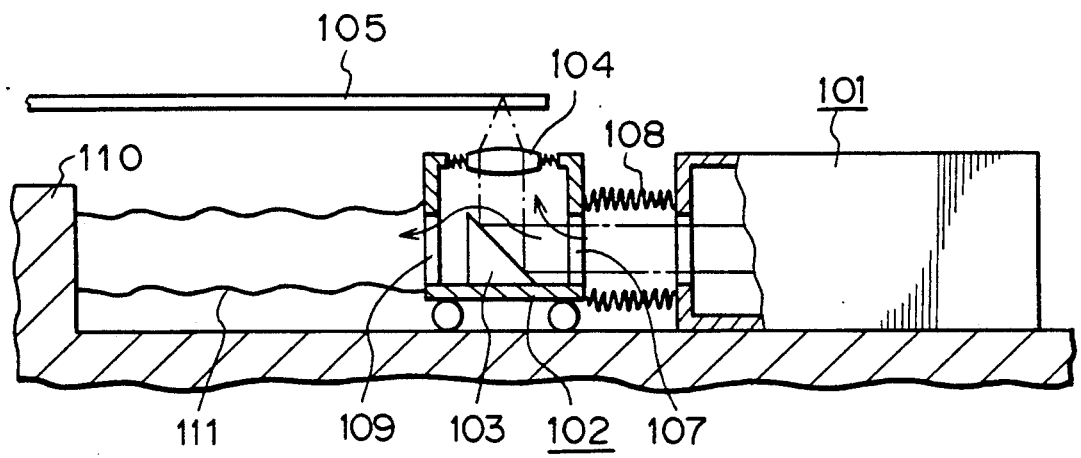
FIG. 13b is an explanatory view of the device of FIG. 13a for explaining the function thereof and illustrating a state of being contracted.

In order to cope with the problem of misfocussing due to the arrangement of bellows mentioned above, another bellows 111 may be arranged between an apparatus body 110 and an opening 109 which is formed in the side wall of the system 102 in the side opposite to the opening 107 thereof, as illustrated in FIGS. 13a and 13b. FIG. 13a illustrates a state wherein the bellows 108 is expanded and the bellows 111 is contracted when the system 102 is moved away from the system 101. Whereas, FIG. 13b illustrates a state wherein the bellows 108 is contracted and the bellows 111 is expanded when the system 102 comes close to the system 101.

By such an arrangement of the second bellows 111, it becomes possible to avoid the pressure change in the space within the systems 101 and 102.

However, in accordance with the structure of FIGS. 13a and 13b mentioned above, air flows as indicated by arrows in the system 102 according as it moves in the tracking operation. Such an air flow in the system 102 might force the lens 104 to displace in the direction of the beam axis, which causes the dislocation of the focal point of the lens 104.

Embodiments of the present invention described below and illustrated in FIGS. 7 to 9 obviate the problems mentioned above.

The same or corresponding parts as those of the embodiments of FIGS. 1 to 3 are designated by the same reference numerals or characters.

Figure 7:
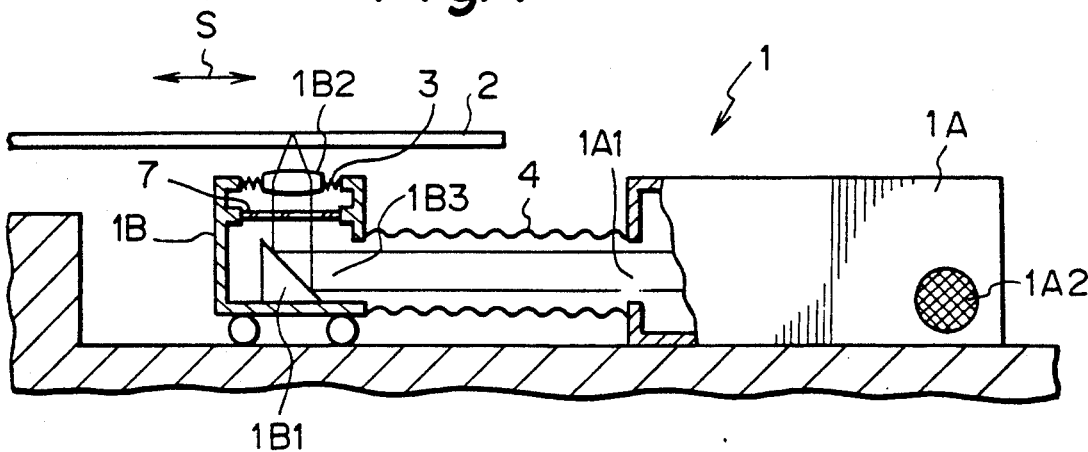
FIG. 7 is a constructional view of a whole structure of a separation type optical pickup device in accordance with still further embodiment of the present invention.

Referring to FIG. 7, a transparent partition 7 is disposed on the optical path of the laser beam between the objective lens 1B2 and the deflection prism 1B1 arranged in the movable unit 1B constituting the movable optical system. An expansible hollow member made from a bellows 4 is disposed between the opening 1A1 of the fixed optical system 1A and the opening 1B3 of the system 1B in such a way that it encloses the optical path of the beam transmitted from the system 1A to the system 1B. Also, a vent filter 1A2 is arranged in the side wall of the system 1A so that the bellows 4 is prevented from being unnecessarily deformed by the change of ambient conditions.

In accordance with the structure of FIG. 7, when the unit 1B is moved at a high speed in the seeking direction with respect to the disk 2, even if the pressure in the unit 1B changes due to the deformation of the bellows 4 or air flows in the unit 1B, the change of the atmospheric condition in the unit 1B does not influence the lens 1B2 since the lens 1B2 is isolated from the atmosphere in the unit 1B by the partition 7. Therefore, the lens 1B2 is not displaced by the change of the pressure in the unit 1B, which makes it possible to perform a stable and reliable focus control.

Figure 8:
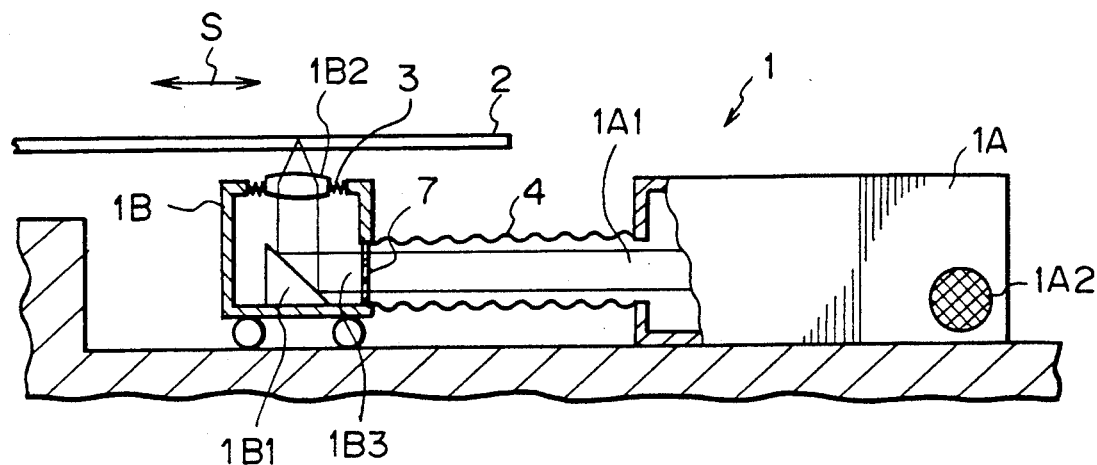
FIG. 8 is a constructional view of a whole structure of a separation type optical pickup device in accordance with still further embodiment of the present invention.

Referring now to FIG. 8, a transparent partition 7 is arranged in the opening 1B3 of the unit of the system 1B. By the arrangement of the partition 7 to close the opening 1B3 of the system 1B, the lens 1B2 is separated from the inner space of the bellows 4. As a result, the lens 1B2 is not influenced by the pressure change in the bellows 4, as in the case of the structure of FIG. 7, so that the lens 1B2 is kept at a controlled position and not displaced therefrom by the pressure change, which makes it possible to perform a stable and reliable focus control.

Figure 9:
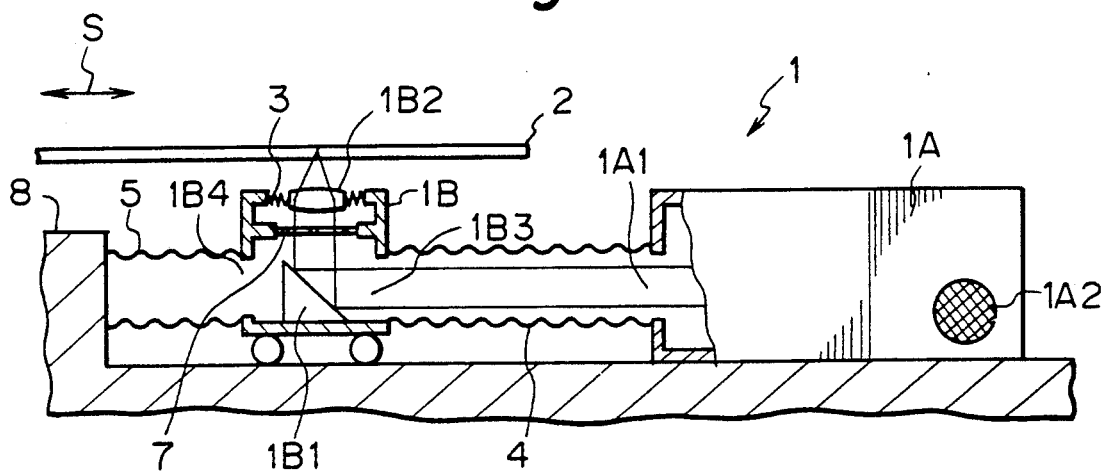
FIG. 9 is a constructional view of a whole structure of a separation type optical pickup device in accordance with still further embodiment of the present invention.

FIG. 9 illustrates a further embodiment of the present invention. In the structure of FIG. 9, an opening 1B4 is formed in the side wall of the system 1B in the side opposite to the opening 1B3 facing to the opening 1A1 of the system 1A. A bellows 5 is arranged between the apparatue body 8 and the opening 1B4, in a manner similar to that of the structure of FIG. 5. Also, a transparent partition 7 is arranged between the lens 1B2 and the prism 1B1, in a manner similar to that of the structure of FIG. 7.

In accordance with such a structure of FIG. 9, the lens 1B2 is not influenced by the air flow in the space within the bellowses 4 and 5 due to the movement of the system 1B, so that the lens 1B2 is not displaced if the air flows in the inner space of the system 1B, which makes it possible to perform a stable and reliable focus control.

Many widely different embodiments of the present invention may be constructed without departing from the spirit and scope of the present invention. It should be understood that the present invention is not limited to the specific embodiments described in the specification, except as defined in the appended claims.

What is claimed is:

1. A separation type optical pickup device for an optical information reading and writing apparatus using an optical recording medium, comprising:
    a fixed optical system, unmovable with respect to said recording medium, and including a means for emitting a laser beam and a fixed opening through which the laser beam is outputted;
    a movable optical system, movable with respect to said recording medium, and having a movable opening for receiving therethrough the laser beam transmitted along a straight path from said fixed optical system, said movable opening facing said fixed opening of said fixed optical system, and a light guide means for guiding the laser beam received through said movable opening to said recording medium in the form of a convergent beam focussed on a surface of said recording medium; and
    an expansible hollow member for interconnecting said fixed optical system and said movable optical system so as to enclose said fixed opening of said fixed optical system, said movable opening of said movable optical system and an optical path of said laser beam formed between said fixed opening of said fixed optical system and said movable opening of said movable optical system.

2. A separation type optical pickup device according to claim 1, wherein said means for emitting a laser beam comprises a semiconductor laser source and a collimator lens for collimating said laser beam.

3. A separation type optical pickup device according to claim 1, wherein said light guide means comprises a deflection means for deflecting said beam toward said recording medium and an objective lens for converging said beam on said recording medium.

4. A separation type optical pickup device according to claim 1, wherein said movable optical system has a second opening formed in a side opposite to said fixed optical system and wherein a second expansible hollow member is arranged between said second opening and an apparatus body in alignment with said hollow member enclosing said laser beam.

5. A separation type optical pickup device according to claim 3, wherein a transparent cover is sealingly disposed over said objective lens of said movable optical system.

6. A separation type optical pickup device according to claim 1, wherein a venting hole is formed in said fixed optical system.

7. A separation type optical pickup device according to claim 3, wherein a transparent partition is disposed between said objective lens and deflection means in said movable system.

8. A separation type optical pickup device according to claim 1, wherein a transparent partition is disposed in said opening of said movable optical system.

9. A separation type optical pickup device for an optical information reading and writing apparatus using an optical recording medium comprising:
    a fixed optical system which is at a fixed position relative to an axis of said recording medium, wherein said fixed optical system includes a source of a laser beam and has a fixed opening through which the laser beam is emitted from the fixed optical system;
    a movable optical system which is movable with respect to said recording medium and has a movable opening which faces said fixed opening and is aligned therewith so that the movable optical system receives through said movable opening the laser beam emitted through said fixed opening from said fixed optical system, wherein said movable optical system further includes a light guide path guiding the laser beam received through said movable opening to said recording medium in the form of a converging beam focussed on a surface of said recording medium; and
    a bellows which interconnects said fixed optical system and said movable optical system and encloses said fixed opening and said movable opening as well as the optical path of said laser beam between said openings to keep dust from entering the space enclosed by the bellows and from entering said optical systems through said openings.

10. A separation type optical pickup device as in claim 9 in which said movable optical system includes another opening which is in fluid flow communication with said movable opening and an expansible member which is in fluid flow communication with said bellows and contract when the bellows expand but expands when the bellows contract, in order to reduce variations in pressure in the bellows due to movement of the movable optical system relative to the fixed optical system.

11. A separation type optical pickup device as in claim 10 in which said expansible member is a bellows.

12. A separation type optical pickup device as in claim 9 in which said fixed optical system includes a filtered vent opening which is in fluid flow communication with said fixed opening to allow air to enter and leave said bellows as the bellows expands and compresses due to movement of the movable optical system.

* * * * *